May 31, 1932.   H. A. NELSON   1,861,239
BEARING MEMBER ASSEMBLY
Filed Feb. 13, 1930

Inventor
Hans A. Nelson
By M. Talbert Dick
Attorney

Patented May 31, 1932

1,861,239

UNITED STATES PATENT OFFICE

HANS A. NELSON, OF EXIRA, IOWA

BEARING MEMBER ASSEMBLY

Application filed February 13, 1930. Serial No. 428,042.

The principal object of this invention is to provide a novel bearing member that permits the removal of an endless belt or chain from around the shaft which it rotatably supports, when there is an opposite bearing member on the other side of the belt or chain preventing its removal in that direction.

A further object of my invention is to provide a bearing member assembly capable of permitting an endless belt or like to be removed from around the shaft which it rotatably supports that is not affected in its alignment when it is returned to a normal position after the belt is removed or replaced.

A still further object of this invention is to provide a bearing member assembly that may be rotatably adjusted to different wearing positions.

A still further object of my invention is to provide a novel bearing member assembly capable of permitting the replacement or removal of an endless belt or like around the shaft which it rotatably supports that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Figure 1:
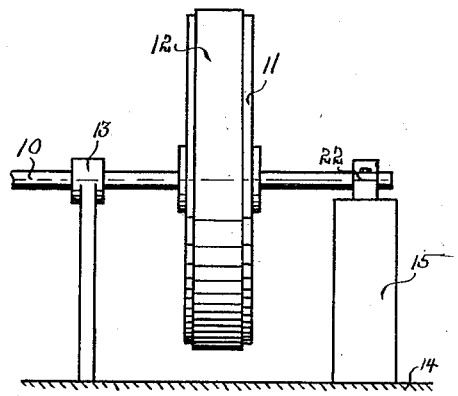
Fig. 1 is an end view of my invention supporting one end of a rotatably mounted shaft.

Much of the present day machinery has a shaft supporting a pulley wheel or like and in turn, itself, supported by bearings on each side of the pulley wheel, respectively. When this arrangement is present the endless belt or like embracing the wheel can not be removed without cutting the belt into or disassembling the bearings. If the belt is cut not only is it damaged, but when it is desired to use it again it must be laced together. If the bearing is disassembled in order to remove the belt from around the shaft, it is impossible to replace it again in its original and correct alignment with the shaft. In either case much time and energy is lost. I have overcome these disadvantages as will be appreciated by those skilled in the art.

I have used the numeral 10 to designate a shaft having secured thereon the pulley wheel 11. The numeral 12 designates an endless belt engaging the pulley wheel. This shaft 10 is rotatably mounted near one of its ends in the usual bearing member 13 and near its other end rotatably mounted in my bearing member assembly. This bearing member 13 and my bearing member assembly are secured to and rest on a suitable support 14.

Figure 3:
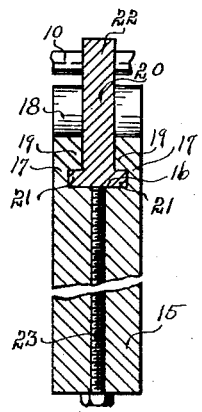
Fig. 3 is an end sectional view of my invention and more fully illustrates its interior construction.
Figure 5:
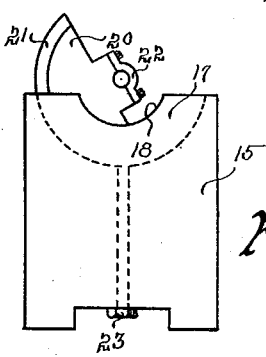
Fig. 5 is a side view of my complete invention illustrating the manner in which the same may be adjusted for different wearing positions.

I shall now describe my bearing member assembly as follows: I have used the numeral 15 to designate the base portion or support of my invention. Formed in the upper end of this base portion 15 is an arcuate track or slot 16 forming a perfect arc but having a length somewhat less than a one-half circle. Integrally formed on the base portion 15 and extending radially inwardly on each side of the circular track 16 is a flange 17 having the same length as the length of the track 16. It will here be noted that each of these flanges 17 are cut away near their centers as shown in Fig. 5, and I have designated this cut-away portion by the numeral 18. Formed on the inner side of each of the flanges 17, extending toward each other and cutting an arc parallel with the track 16 is a projection 19 as shown in Fig. 3. These two circular and elongated projections are spaced apart and are some distance from the face of the track 16. By such a construction it will readily be seen that a circular slot will be formed in the upper portion of the base portion 15 and a cross section of the same as shown in Fig. 3, will show it to be of inverted T-construction. The numeral 20 designates a rotatable bearing portion or member of my invention in the form of a segment of a circle or wheel, having dimensions slightly less than a half circle and having its periphery engaging and corresponding with the track 16. It will be noted that the rotatable bearing member 20 is symmetrical in a plane passing through it and the track 16. The numeral 21 designates a laterally and outwardly extending flange on each side of the member 20 and adjacent its periphery. These two flanges 21 engage the underside of the two projections 19, respectively, as shown in Fig. 3, complete the filling up of the T-construction slot in the base portion 15 and prevents the upward or downward movement of the member 20 but permits its rotary movement relative to the member 15. Secured and formed on the center top of the member 20 is the ordinary split bearing 22 rotatably supporting one end of the shaft 10. The center of this split bearing 22 should be common center of the arc cut by the periphery of the rotatable member 20 and the track 16.

Figure 2:
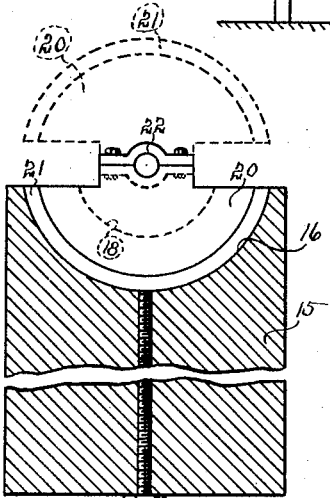
Fig. 2 is a side sectional view of my invention with dotted lines showing the position of the same when in an abnormal position for removing or replacing an endless belt.

By rotating the rotatable portion 20 one-half revolution as shown by dotted lines in Fig. 2, the split bearing 22 will not be supported by the base 15 and a space will exist, by the cut-away portion 18 between the split bearing 22 and the base 15, thereby allowing the endless belt 12 to be removed from around the shaft 10 or replaced around the shaft 10 and on the pulley wheel 11. To accomplish this result the belt, chain or like is passed between the split bearing 22 and the base portion 15. After the belt is removed or replaced the rotatable portion 20 is returned to a normal position in the circular inverted T-slot in the base portion 15, in which position the split bearing 22 will be rigidly held and supported to and on the base portion 15. In other words the split bearing 22 will be returned always to its same proper alignment relative to the shaft 10, as it has not been changed in the least and the only action that took place was the partial rotating of the split bearing 22 on the shaft 10.

In order to eliminate the accidental rotation of the rotatable member 20 I have provided a set screw 23 threaded into the base portion 15 and engaging the periphery of the rotatable member 20 as shown in the drawings. When it is desired to manually rotate the rotatable member 20 relative to the shaft 10 the set screw 23 should be loosened to permit the free rotation of the member 20 in the slot formed in the base 15. As soon as the member 20 is returned to a normal position the set screw 23 should be tightened until it successfully engages the member 20 for holding the same against undesirable rotation.

Figure 4:
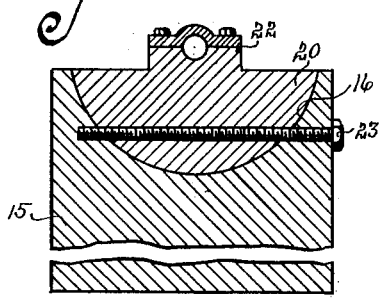
Fig. 4 is a side sectional view of a modified form of construction of my invention.

Different wearing surfaces of the split bearing 22 on the shaft 10 may be obtained by the removing of the member 20 and turning it around so that its inner face becomes its outer face and its outer face becomes its inner face. This is very often desirable when the belt or like 12 is pulling the shaft 10 against the split bearing 22 continuously in one direction. Also a change of wearing surfaces in the split bearing 22 may be obtained as shown in Fig. 5, by rotating the member 20 to semi-unnormal position in the base 15 and the holding of it in this position by the set screw 23. In the modified construction shown in Fig. 4, the set screw 23 is threaded into the base 15, then into and through the member 20, and then into the portion of the base 15 on the other side of the member 20. This construction rigidly holds the member 20 in a normal position in and on the base 15, and when this construction is used the elongated projections 19 and the flanges 21 are unnecessary. This modified form of construction shown in Fig. 4, is more economical in manufacture than the construction shown in Fig. 2, but it has the disadvantage in that the rotatable member 20 cannot be adjustably secured at various positions relative to the base 15 as shown in Fig. 5.

Some changes may be made in the construction and arrangement of my improved bearing member assembly without departing from the real spirit and purpose of my invention, and it is my intention to cover by my claims any modified forms of structure or use of mechanical equivalents which may be reasonably included within their scope.

I claim:

1. In a device of the class described, a support having a track formed therein, a bearing member movable in said track in a plane passing thru the member and track, said bearing member being symmetrical about said plane, and means for rigidly securing the member in various positions of its movement in the track.

2. In a device of the class described, a support having an arcuate slot formed therein, a member rotatable in said slot in a plane passing thru the slot and member, said member being symmetrical about said plane, a bearing supported by the member, and means passing thru the member and support for rigidly securing the member in position in the support.

3. In a device of the class described, a support having a T-shaped slot formed therein, a member having a base corresponding in shape with the slot and rotatable in said slot and in a plane passing thru the slot and member, said member being symmetrical about said plane, a bearing supported by said member, and means threaded thru the support and frictionally engaging the base of the member for securing it in various positions of its rotation in the slot.

4. In a device of the class described, a support having a slot therein, a shaft bearing member rotatable in and out of said slot about said shaft and in the plane of the slot, said slot having a reduced upward opening throughout the length thereof so as to permit only arcuate displacement of said bearing member, and means for adjustably displacing said member.

HANS A. NELSON.